(12) United States Patent
Busch et al.

(10) Patent No.: US 12,360,090 B2
(45) Date of Patent: Jul. 15, 2025

(54) USING MULTI-COMPONENT TEST SAMPLE FOR DETERMINING REAL PARAMETER VALUE OF SAMPLE SEPARATION

(71) Applicant: Agilent Technologies, Inc., Santa Clara, CA (US)

(72) Inventors: Kyle Robert Busch, Karlsruhe (DE); Uwe Effelsberg, Karlsruhe (DE)

(73) Assignee: Agilent Technologies, Inc., Santa Clara, CA (US)

( * ) Notice: Subject to any disclaimer, the term of this patent is extended or adjusted under 35 U.S.C. 154(b) by 471 days.

(21) Appl. No.: 17/706,184

(22) Filed: Mar. 28, 2022

(65) Prior Publication Data

US 2022/0317102 A1 Oct. 6, 2022

(30) Foreign Application Priority Data

Mar. 30, 2021 (GB) ...................................... 2104524

(51) Int. Cl.
| | |
|---|---|
| *G01N 30/56* | (2006.01) |
| *G01N 30/16* | (2006.01) |
| *G01N 30/80* | (2006.01) |
| *G01N 30/86* | (2006.01) |
| *G01N 30/02* | (2006.01) |

(52) U.S. Cl.
CPC ......... *G01N 30/8658* (2013.01); *G01N 30/16* (2013.01); *G01N 30/80* (2013.01); *G01N 30/8665* (2013.01); *G01N 2030/027* (2013.01)

(58) Field of Classification Search
None
See application file for complete search history.

(56) References Cited

U.S. PATENT DOCUMENTS

| | | |
|---|---|---|
| 6,456,955 B1 | 9/2002 | Andrews et al. |
| 10,013,338 B2 | 7/2018 | Leclair et al. |
| 2012/0096919 A1 | 4/2012 | Choikhet et al. |
| 2016/0327528 A1 | 11/2016 | Witt et al. |
| 2020/0158697 A1 | 5/2020 | Jensen et al. |

FOREIGN PATENT DOCUMENTS

| | | | | |
|---|---|---|---|---|
| DE | 102020114618 A1 | * | 8/2020 | ............. G01N 30/86 |
| DE | 102019111783 A1 | * | 11/2020 | ......... G01N 30/8658 |

(Continued)

OTHER PUBLICATIONS

EPO Extended European Search Report dated Jul. 27, 2022 for Application No. 22164768.8; 7 Pages.

(Continued)

*Primary Examiner* — Daniel S Larkin

(57) ABSTRACT

A process which, on the basis of a provided test sample including a mix of a plurality of pre-known sample components and on the basis of provided absolute sample separation properties for each of the sample components, includes experimentally determining a real sample separation result by executing a sample separation method for separating the test sample by a sample separation apparatus, and determining a real value of at least one operation parameter based on a comparison between the absolute sample separation properties and the real sample separation result for characterizing a real course of the sample separation method.

19 Claims, 5 Drawing Sheets

(56) References Cited

FOREIGN PATENT DOCUMENTS

EP    3161475 A1    5/2017
EP    3425369 A1    1/2019

OTHER PUBLICATIONS

UK Patent Office search report issued for application No. GB 2104524.0 dated Sep. 17, 2021; 4 pages.
Klarqvist, Magnus, et al., A Test Mixture for Performance Verification of Multi-User UHPLC-MS Instruments; LCGC Asia Pacific, vol. 20, Issue 1; Mar. 1, 2017, pp. 6-11.
Mutton, Ian et al., The design and use of a simple System Suitability Test Mix for generic reverse phase high performance liquid chromatography-mass spectrometry systems and the implications for automated system monitoring using global software tracking; Journal of Chromatography A, 1218; Feb. 15, 2011; pp. 3711-3717.

* cited by examiner

USING MULTI-COMPONENT TEST SAMPLE FOR DETERMINING REAL PARAMETER VALUE OF SAMPLE SEPARATION

RELATED APPLICATIONS

This application claims priority to UK Application No. 2104524.0, filed Mar. 30, 2021, the entire contents of which are incorporated herein by reference.

TECHNICAL FIELD

The present invention relates to a process, a sample separation apparatus, a program element and a computer readable medium involving the use of a test sample for determining a real value of one or more operation parameters associated with sample separation, such as by chromatography.

BACKGROUND

Fluidic devices are used to execute various measurement tasks in order to measure any kind of physical parameter. Each fluidic device may have a specific driver with device specific commands. A programming software allows a user to design an operation mode of the fluidic device. As a result of such a design, the fluidic device may be operated in accordance with the designed operation mode.

More particularly, in liquid chromatography, a fluidic analyte may be pumped through a column comprising a material which is capable of separating different components of the fluidic analyte. Such a material, so-called beads, may be filled into a column tube which may be connected to other elements (like a control unit, containers including sample and/or buffers). Upstream of a column, the fluidic sample or analyte is loaded into the liquid chromatography apparatus. A controller controls an amount of fluid to be pumped through the liquid chromatography apparatus, including controlling a composition and time-dependency of a solvent interacting with the fluidic analyte. Such a solvent may be a mixture of different constituents. The supply of these constituents for subsequent mixing is an example of an operation to be designed by an operator of a liquid chromatography device.

However, when a sample separation method is executed, a real behavior during sample separation may deviate significantly from a target behavior. This may be due to a non-ideal behavior of sample separation apparatuses.

Ian Mutton, Bob Boughtflower, Nick Taylor, Daniel Brooke "The design and use of a simple System Suitability Test Mix for generic reverse phase high performance liquid chromatography—mass spectrometry systems and the implications for automated system monitoring using global software tracking", Journal of Chromatography A, 1218 (2011), pages 3711-3717 discloses the development of a seven-component test mixture designed for use with a generic gradient and a reversed-phase high performance liquid chromatography—mass spectrometry (RP-HPLC-MS) system. Unlike many test mixtures formulated in order to characterize column quality at neutral pH, the test mixture is designed to permit an overall suitability assessment of the whole liquid chromatography—mass spectrometry (LCMS) system. The mixture is designed to test the chromatographic performance of the column as well as certain aspects of the performance of the individual instrumental components of the system. The System Suitability Test Mix can be used for low and high pH generic reverse phase LCMS analysis. Four phthalates are used: diethyl phthalate (DEP), diamyl phthalate (DAP), di-n-hexyl phthalate (DHP) and dioctyl phthalate (DOP). Three other probes are employed: 8-bromoguanosine (8-BG), amitryptyline (Ami), and 4-chlorocinnamic acid (4-CCA). Analysis of this test mixture can alert the user when any part of the system (instrument or column) contributes to loss of overall performance and may require remedial action. This test mixture can provide information enabling a user to document data quality control.

SUMMARY

It is an object of the invention to precisely characterize a real behavior during execution of a separation method by a sample separation apparatus.

According to an exemplary embodiment, a process is provided which, on the basis of a provided test sample comprising a mix of a plurality of pre-known sample components and on the basis of provided absolute sample separation properties for each of the sample components (in particular on the basis of provided data sets indicative of absolute sample separation properties for each of the sample components), comprises experimentally determining a real sample separation result by executing a sample separation method for separating the test sample by a sample separation apparatus, and determining a real value of at least one operation parameter based on a comparison between the absolute sample separation properties (in particular provided in the form of data sets) and the real sample separation result for characterizing a real course (or run) of the sample separation method.

According to another exemplary embodiment, a sample separation apparatus for separating a fluidic sample is provided, wherein the sample separation apparatus comprises a fluid drive for driving a mobile phase and the fluidic sample when injected in the mobile phase, a sample separation unit for separating the fluidic sample in the mobile phase, and a processor configured for carrying out or controlling a process having the above-mentioned features using the sample separation apparatus (in particular using the fluid drive and the sample separation unit of the sample separation apparatus) and using the test sample as the fluidic sample.

According to still another exemplary embodiment of the invention, a program element (for instance a software routine, in source code or in executable code, for instance provided in form of an app) is provided, which, when being executed by a processor (such as a microprocessor or a CPU), is adapted to control or carry out a method having the above mentioned features.

According to yet another exemplary embodiment of the invention, a computer-readable medium (for instance a CD, a DVD, a USB stick, a floppy disk or a hard disk, for instance located on a cloud) is provided, in which a computer program is stored which, when being executed by a processor (such as a microprocessor or a CPU), is adapted to control or carry out a method having the above mentioned features.

Data processing which may be performed according to embodiments of the invention can be realized by a computer program, that is by software, or by using one or more special electronic optimization circuits, that is in hardware, or in hybrid form, that is by means of software components and hardware components.

In the context of the present application, the term "sample separation apparatus" may particularly denote any apparatus which involves the transport, analysis or processing of fluids for separation of a fluidic sample. A fluid may denote a liquid, a gas or a combination of a liquid and a gas, and may optionally also include solid particles, for instance forming a gel or an emulsion. Such a fluid may comprise a mobile phase (such as a fluidic solvent or solvent composition) and/or a fluidic sample under analysis. Examples for sample separation apparatuses are chemical analysis devices, life science apparatuses or any other biochemical analysis system such as a separation device for separating different components of a sample, particularly a liquid chromatography device. For example, the sample separation can be done by chromatography or electrophoresis.

In the context of the present application, the term "separation method" may particularly denote an instruction for a sample separation apparatus as to how to separate a fluidic sample, which is to be carried out by the sample separation apparatus in order to fulfill a separation task associated with the separation method. Such a separation method can be defined by a set of parameter values (for example temperature, pressure, characteristic of a solvent composition, etc.) and hardware components of the sample separation apparatus (for example the type of separation column used) and an algorithm with commands or instructions that are executed when the separation method is carried out. A corresponding set of technical parameters for operating the sample separation apparatus during sample separation may be pre-known, for instance stored in a database or memory accessible by a control unit controlling operation of the sample separation apparatus. Physical properties or operation parameters characterizing a separation method may involve a transport characteristic which may include parameters such as volumes, dimensions, values of physical parameters such as pressure or temperature, and/or physical effects such as a model of friction occurring in a fluidic conduit which friction effects may be modeled, for example, according to the Hagen Poiseuille law. More particularly, the parameterization may consider dimensions of a sample separation apparatus (for instance a dimension of a fluidic channel), a volume of a fluid conduit (such as a dead volume) of the sample separation apparatus, a pump performance (such as the pump power and/or pump capacity) of the sample separation apparatus, a delay parameter (such as a delay time after switching on a sample separation apparatus) of operating the sample separation apparatus, a friction parameter (for instance characterizing friction between a wall of a fluidic conduit and a fluid flowing through the conduit) of operating the sample separation apparatus, a flush performance (particularly properties related to rinsing or flushing the sample separation apparatus before operating it or between two subsequent operations) of the sample separation apparatus, and/or a cooperation of different components of the sample separation apparatus (for instance the properties of a gradient applied to a chromatographic column).

In the context of the present application, the term "fluidic sample" may particularly denote a medium containing the matter which is actually analyzed (for example a biological sample, such as a protein solution, a pharmaceutical sample, etc.).

In the context of the present application, the term "mobile phase" may particularly denote a fluid (in particular a liquid) which serves as a carrier medium for transporting a fluidic sample from a fluid drive (such as a high pressure pump) to a sample separation unit (such as a chromatographic column) of a sample separation apparatus. For example, the mobile phase may be a (for example, organic and/or inorganic) solvent or a solvent composition (for example, water and ethanol).

In the context of the present application, the term "test sample comprising a mix of a plurality of pre-known sample components" may particularly denote a fluidic sample which can be inserted into a sample separation apparatus for being separated by executing a separation method, wherein several different sample components with predetermined attributes may form part of the sample mix. By knowing or determining attributes of the sample components upfront, i.e. before a separation, the test sample may function as a standard or sensor which, when separated by a sample separation apparatus, delivers meaningful information about the real behavior of the sample separation apparatus when carrying out a separation method. Advantageously, the components of the test sample may be orthogonal in terms of their chromatographic behavior, i.e. do not interact with each other what concerns their behavior in a chromatogram.

In the context of the present application, the term "absolute sample separation properties" may particularly denote intrinsic properties of each individual of the components of the test sample. At least part of the absolute sample separation properties may be related to a behavior of a respective component during execution of a separation method. Such absolute separation properties may be in particular independent of a specific sample separation apparatus on which a separation method is carried out, i.e. may remain unchanged when the sample separation apparatus is changed. In other words, the absolute sample separation properties of a respective component may be the same on different types of sample separation apparatuses.

In the context of the present application, the term "real sample separation result" (for instance a real chromatogram) may particularly denote an actual or real outcome of the execution of a separation method on a sample separation apparatus reflecting a non-ideal behavior thereof. Such a non-ideal behavior may relate to inaccuracies of the members of a sample separation apparatus, as well as parasitic effects such as friction, thermal interaction with the environment, leakage, fluid delay phenomena, compressibility of liquids, etc.

In the context of the present application, the term "operation parameter" may particularly denote a parameter of a set of multiple parameters defining and/or being present during a respective separation method and describing a property adjusted or occurring during operation of a sample separation apparatus when executing a separation method. Such operation parameters can include in particular a physical separation condition (in particular pressure and/or temperature, for instance at a sample separation unit such as a chromatographic column, a wavelength of a detector, integration parameters, etc.), properties of fluids used for operation (for instance a solvent composition of a mobile phase, a gradient profile, etc.), etc.

In the context of the present application, the term "real value of at least one operation parameter" may particularly denote a value of a respective operation parameter which is in fact or in reality present in the sample separation apparatus during execution of a separation method. Such a real value may deviate from a target value which should be present ideally during execution of the separation method. For example, a separation method may define a target temperature of 80° C. in a stationary phase of the sample separation unit during separation. In reality, the real value of the temperature may be 76° C., for instance due to a non-ideal behavior.

In the context of the present application, the term "characterizing a real course of the sample separation method" may particularly denote determining information concerning how a separation method is in fact carried out and behaves in practice, i.e. in reality rather than assuming an ideal behavior.

In the context of the present application, the term "comparison between the absolute sample separation properties and the real sample separation result" may particularly denote any analysis, evaluation, calculation and/or simulation which takes into account the absolute sample separation properties as well as the real sample separation results. For instance, the real sample separation result may be fitted to the actual sample separation properties in the context of this comparison, in particular using the values of operation parameters as variable fit parameters.

According to an exemplary embodiment of the invention, a test sample with multiple pre-known or determinable sample components and having pre-known or determinable absolute sample separation properties is used for experimentally determining a real sample separation result (such as an actual or real chromatogram obtained by carrying out a gradient run of a chromatographic separation method on a chromatographic sample separation apparatus using the test sample for separation). The absolute sample separation properties may be known from or determined by calibration measurements with the test sample (for instance delivering chromatograms by executing an isocratic run) providing information for each individual component for different values and/or types of operation parameters. On the basis of the well-characterized components of the test sample, it may then be possible to determine a real or actual—rather than target—value of one or more operation parameters in the course of execution of a separation method on the sample separation apparatus used for obtaining the real sample separation result. Advantageously, such a real operation parameter value can be obtained by comparing the absolute sample separation properties and the real sample separation result. For instance, a deviation identified by such a comparison may be the fingerprint of a deviation of a real operation parameter value (for example a real temperature at a sample separation unit during separation) with respect to a target operation parameter value (for example a desired target temperature at the sample separation unit during separation, as intended to be adjusted by a separation method). This may allow to obtain information for characterizing the way how the sample separation method is actually carried out. For instance, embodiments may use a test mix allowing the determination of real values of an operation parameter (such as flowrate, column temperature, gradient accuracy) based on the above-described comparison. Consequently, embodiments may allow to characterize a real operation of the sample separation apparatus even without the use of external sensors (which may be present additionally as well in certain embodiments). Descriptively speaking, the components of the test sample may act as fluidic sensors, wherein the presence of several components may provide orthogonal or complementary (for delivering independent information) and/or redundant (for increasing accuracy) information. Various applications are possible according to exemplary embodiments of the invention, such as a separation method transfer between different sample separation apparatuses, an accurate diagnostic tool for potential issues of the sample separation apparatus, a substitution of or addition to external sensors by test sample-intrinsic sensors, operational qualification of the sample separation apparatus, emulation of another sample separation apparatus, etc.

Next, further exemplary embodiments of the process, the sample separation apparatus, the program element and the computer readable medium will be explained.

In an embodiment, the processor is configured for and/or the process comprises providing the test sample with at least part of the sample components, in particular at least one late eluting sample component, having absolute sample separation properties with pronounced temperature dependence. In an embodiment, a component of the test sample showing a pronounced temperature dependent behavior in a chromatogram may substitute for a conventional temperature sensor. Such a component may show a retention time in a chromatogram being sensitive to the temperature in a sample separation unit (such as a chromatographic separation column) during executing a separation method. It has turned out that late diluting components, i.e. components on the right-hand side of a chromatogram, may show such a strong temperature dependence.

In an embodiment, the processor is configured for and/or the process comprises providing the test sample with at least part of the sample components, in particular at least one early eluting sample component, having absolute sample separation properties with pronounced flowrate dependence. In such an embodiment, a component of the test sample showing a pronounced flowrate dependent behavior in a chromatogram may substitute for a conventional flowmeter. Such a component may show a retention time in a chromatogram being sensitive to the flowrate of a mobile phase used during executing a separation method. It has turned out that early diluting components, i.e. components on the left-hand side of a chromatogram, may show such a strong flowrate dependence.

In an embodiment, the processor is configured for and/or the process comprises providing the test sample with at least part of the sample components, in particular at least one sample component with elution speed between at least one early eluting sample component and at least one late eluting sample component, having absolute sample separation properties with pronounced dependence on a solvent composition, in particular a gradient profile. In such an embodiment, a component of the test sample showing in a chromatogram a behavior which depends strongly on a gradient profile (i.e. a time-dependent solvent composition) during a gradient run may be used to determine an actual gradient profile or solvent composition. Such a component may show a retention time in a chromatogram being sensitive to the gradient profile or solvent composition during executing a separation method. It has turned out that components having elution times between early diluting components and late diluting components, i.e. components in a central portion of a chromatogram, may show such a pronounced sensitivity concerning gradient profile or solvent composition.

In an embodiment, the absolute sample separation properties are independent of apparatus properties of a sample separation apparatus by which the sample components are separated. Thus, the sample separation properties may be attributes of the components of the test sample only, and may be independent of a specific sample separation apparatus on which the test sample is separated. Advantageously, this allows to calibrate the components of the test sample only once and to use this calibration information (i.e. the absolute sample separation properties) for simulation on any type of sample separation apparatus. Advantageously, recalibration may become dispensable, and this renders the architecture according to exemplary embodiments of the invention particularly simple.

In an embodiment, the absolute sample separation properties are chromatographic sample separation properties. For instance, chromatographic sample separation properties may describe a dependence of a respective component of the test sample on temperature of a chromatographic separation column, flowrate of mobile phase at the chromatographic separation column, a gradient profile of a solvent composition flowing through a chromatographic separation column, etc.

In an embodiment, the processor is configured for and/or the process comprises determining the absolute sample separation properties by executing calibration measurements for each of the sample components by varying at least one operation parameter (see for example FIG. 7), in particular by varying a plurality of operation parameters (see for example FIG. 5 and FIG. 6). For instance, chromatograms may be measured for the test sample and its components for different values of each operation parameter. On the basis of such information, two-dimensional, three-dimensional or four- or more dimensional characteristics for the components of the test sample can be established.

In an embodiment, the processor is configured for and/or the process comprises executing the calibration measurements by executing a chromatographic sample separation method. Thus, experimental chromatograms with the test sample may be measured, wherein different operation parameter values may be adjusted for measuring the different chromatograms.

In an embodiment, the processor is configured for and/or the process comprises executing the calibration measurements by varying at least one operation parameter of the group consisting of temperature of the respective sample component, flowrate of a mobile phase by which the respective sample component is transported and/or separated, and composition of a mobile phase by which the respective sample component is transported and/or separated. The mentioned parameters are particularly of interest for chromatographic separation on a chromatographic sample separation apparatus.

In an embodiment, the processor is configured for and/or the process comprises executing the calibration measurements in an isocratic mode. Hence, calibration measurements may be performed preferably in an isocratic mode (i.e. without varying solvent composition over time for one respective chromatogram), so that each individual operation parameter can be calibrated individually. This may provide particularly meaningful calibration results, since complex interactions between different operation parameters may be switched off or at least suppressed.

In an embodiment, the processor is configured for and/or the process comprises experimentally determining the real sample separation result by executing the sample separation method in a gradient mode. Is also possible that the process comprises experimentally determining the real sample separation result by executing a chromatographic sample separation method. In particular, experimentally determining a real sample separation result may comprise measuring a chromatogram by executing a chromatographic separation method on a chromatographic sample separation apparatus. Advantageously, this can be done in a gradient run during which the solvent composition of a mobile phase driven through a chromatographic separation column is changed over time for individually desorbing previously adsorbed components of the test sample from a stationary phase of the chromatographic separation column.

In an embodiment, the processor is configured for and/or the process comprises determining a real value of at least one operation parameter of a group consisting of a temperature during sample separation, a flowrate of a mobile phase by which the test sample is transported and/or separated, a composition of a mobile phase by which the test sample is transported and/or separated, and at least one performance value indicative of a performance of the sample separation apparatus, in particular indicating whether a performance of the sample separation apparatus complies with a predefined specification. The mentioned parameters are of particular relevance for a chromatographic separation run. However, other operation parameters may be considered as well, additionally or alternatively. The one or more determined operation parameter values may be numerical values (for instance a column temperature of 78° C.) and/or logical values (for instance the logical value "true" or "false" indicating whether or not the sample separation apparatus has passed a performance test, for instance complies or does not comply with a predefined specification).

In an embodiment, the processor is configured for and/or the process comprises determining a real value of at least one operation parameter including, as a preliminary stage, determining an ideal sample separation result. An ideal sample separation result may be a result expected when executing the separation method on the sample separation apparatus in an exact way, i.e. without any inaccuracies caused by the sample separation apparatus, a fluidic sample to be separated, and an environment. Advantageously, such an ideal sample separation result, for example a simulated chromatogram, may be used as a basis for the comparison with the real sample separation result for characterizing a real course of the sample separation method.

In an embodiment, the processor is configured for and/or the process comprises determining the ideal sample separation result by a simulation using the absolute sample separation properties, in particular by simulating execution of the sample separation method for separating the test sample by the sample separation apparatus using the absolute sample separation properties. Hence, a simulated chromatogram may be determined by simulating separation of the test sample in its components by executing the separation method on the sample separation apparatus taking into account the absolute sample separation properties of the components of the test sample, and under the assumption that no inaccuracies occur.

In an embodiment, the processor is configured for and/or the process comprises repeatedly determining an ideal sample separation result in an iterative way, in particular by simulating execution of the sample separation method with different values of the of at least one operation parameter. The aforementioned simulation of a chromatogram may thus be repeated iteratively with different values of the one or more operation parameters. As a result, a plurality of different simulated chromatograms may be obtained, each corresponding to an assigned set of operation parameter values.

In an embodiment, the processor is configured for and/or the process comprises determining the real value of the at least one operation parameter as the value of the at least one operation parameter which corresponds to an ideal sample separation result complying with the real sample separation result, in particular showing the best match with the real sample separation result among the repeatedly and iteratively determined ideal sample separation results. A proper or best match between the simulated chromatograms and the measured chromatogram may then deliver the real value of the at least one operation parameter corresponding to the (in particular best) matching simulated chromatogram.

In an embodiment, the processor is configured for and/or the process comprises determining the at least one real parameter value by carrying out a numerical analysis under consideration of the absolute sample separation properties. In the context of the present application, the term "numerical analysis" may particularly denote algorithmic methods that use numerical approximation and/or algorithms for problems of mathematical analysis. A goal of numerical analysis when applied to simulations for determining real operation parameter values is the design and analysis of techniques to give approximate but accurate solutions to hard problems relating to determining the at least one real parameter value. Numerical analysis may create, analyze and/or implement algorithms for obtaining numerical solutions to appropriateness judgment related problems involving continuous variables.

In an embodiment, the processor is configured for and/or the process comprises carrying out the numerical analysis using at least one of the group consisting of a finite element method (FEM) analysis, a finite difference method (FDM) analysis, a boundary element method (BEM) analysis, a control volume method (CVM) analysis, and a random walk method analysis.

A finite element method (FEM) may be preferred. In particular, a finite element method (FEM) can be implemented as a particular numerical method for solving partial differential equations in two or three space variables. To solve a problem, the FEM may subdivide a large system into smaller, simpler parts that are called finite elements. This may be achieved by a particular space discretization in the space dimensions, which may be implemented by the construction of a mesh of the object, i.e. the numerical domain for the solution which has a finite number of points. The finite element method formulation of a boundary value problem may finally result in a system of algebraic equations. The method may approximate the unknown function over the domain. The simple equations that model these finite elements may then be assembled into a larger system of equations that models the entire problem. For instance, a finite element method applied to a sample separation apparatus may spatially fractionize a sample separation unit (such as a chromatographic separation column) into a large plurality of volume elements. For each volume element, the behavior may be calculated during execution of an operation such as a separation method. By taking this measure, the behavior of the entire system, i.e. of the entire sample separation unit may be simulated. Correspondingly, a mobile phase pump, a sample injector, etc. of a sample separation apparatus may be subject of a corresponding finite element analysis as well.

Additionally or alternatively, a finite difference method (FDM) may be carried out which performs discretizations used for solving differential equations by approximating them with difference equations that finite differences approximate the derivatives. FDM may convert a linear ordinary differential equations or non-linear partial differential equations into a system of equations that can be solved by matrix algebra techniques.

Additionally or alternatively, a boundary element method (BEM) may be carried out which may be a numerical computational method of solving linear partial differential equations which have been formulated as integral equations. The integral equation may be regarded as an exact solution of the governing partial differential equation. The boundary element method attempts to use the given boundary conditions to fit boundary values into the integral equation, rather than values throughout the space defined by a partial differential equation. Once this is done, in a post-processing stage, the integral equation can then be used again to calculate numerically the solution directly at any desired point in the interior of the solution domain.

Additionally or alternatively, in a control volume method (CVM), a complete region may be subdivided into control volumes. Nodes may be located at the center of the control volumes. A statement of a conservation equation may be used to form difference equation, or the differential form of the conservation equation may be integrated over the control volume to form difference equation.

Additionally or alternatively, a random walk method may be carried out which may be considered as a mathematical object that describes a path that consists of a succession of random steps on a mathematical space, such as integers.

Particularly preferred may be the finite element analysis. However, also one or more of the other mentioned and/or further numerical analysis methods may be advantageously implemented, additionally or alternatively.

In an embodiment, the processor is configured for and/or the process comprises, on the basis of a provided further test sample comprising a further mix of a plurality of pre-known further sample components and on the basis of provided absolute sample separation properties for each of the further sample components, experimentally determining a further real sample separation result by carrying out a sample separation method for separating the further test sample by a sample separation apparatus, and determining the real value of the at least one operation parameter based on a comparison between the absolute sample separation properties and the real sample separation result of the mix and the further mix for characterizing the real course of the sample separation method. Hence, instead of using a single test sample with a certain number of components (for instance seven components), it may also be possible to use a plurality of test samples (for example two test samples) each comprising a smaller number of components (for example a first test sample with four components, and a second test sample with three other components). By using different less complex test samples which can be separated in different runs, an interaction between components of the different test samples during calibration and/or experimentally determining a real sample separation result may be avoided.

In an embodiment, the processor is configured for and/or the process comprises using the determined real value of the at least one operation parameter as sensed value of the at least one operation parameter, in particular as at least one of the group consisting of a sensed temperature, a sensed flowrate, a sensed solvent composition, and a sensed gradient profile. Hardware sensors (for instance a temperature sensor, a flowrate sensor, a pressure sensor) may then be avoided, partially or entirely. It is also possible to additionally use hardware sensors, wherein the hardware sensors and the components of the test sample functioning as fluidic sensors may provide complementary information for further refining the determination of the real value(s).

In an embodiment, the processor is configured for and/or the process comprises using the determined real value of the at least one operation parameter as a performance indicator indicating a performance of the sample separation apparatus by which the real sample separation result is experimentally determined, in particular as a performance indicator indicating whether the sample separation apparatus complies with a predefined specification, wherein in particular the performance indicator is used in the context of at least one of the group consisting of an initial installation of the sample separation apparatus, a repair of the sample separation apparatus, a maintenance of the sample separation apparatus, and an expiry of a pre-defined time since a previous determination of the performance indicator. Advantageously, embodiments of the invention may enable an operational qualification of a sample separation apparatus. Upon installation, after repair, and/or after maintenance of the sample separation apparatus, such an operational qualification may check whether the actual behavior of the sample separation apparatus complies with a predefined specification (for instance a deviation of a real gradient profile from a target gradient profile is less than 1%). Such an operational qualification may be carried out by an exemplary embodiment of the invention in a fully automated way, for instance by carrying out a software routine. Hence, an exemplary application relates to a sample separation apparatus which can carry out a performance check without device sensors.

In an embodiment, the processor is configured for and/or the process comprises using the determined real value of the at least one operation parameter for transferring the sample separation method between the sample separation apparatus and another sample separation apparatus. Another advantageous application of an exemplary embodiment of the invention hence relates to a transfer of a separation method from one the separation apparatus to another sample separation apparatus. Such a method transfer can be carried out in a very simple way by characterizing the components of the test sample by determining their apparatus-independent absolute sample separation properties only once by calibration. When the same test sample is used for measuring a chromatogram on different sample separation apparatuses, a simulation on different sample separation apparatuses may use the same absolute sample separation properties without an apparatus-specific calibration.

In an embodiment, the processor is configured for and/or the process comprises using the determined real value of the at least one operation parameter for diagnosing a potential malfunction of the sample separation apparatus or a part thereof. In such an embodiment, the system may be used as a diagnostic tool for issues with a sample separation apparatus, for instance when determining that a gradient profile of a liquid chromatography apparatus deviates significantly from a target behavior. A user can simply carry out a measurement on the sample separation apparatus using the test sample and a specific separation method to determine a measured chromatogram. By comparison of the measured chromatogram with simulated chromatograms taking into account the absolute sample separation properties of the components of the test sample, a likely cause for the deviation may be determined (for example an erroneous pump head or proportioning valve).

In an embodiment, the processor is configured for and/or the process comprises using the determined real value of the at least one operation parameter for emulating execution of the sample separation method on another sample separation apparatus. In such an embodiment, the performance of one sample separation apparatus may be emulated on another sample separation apparatus, for instance based on a simulation on different HPLCs. Descriptively speaking, one sample separation apparatus may then mimic execution of the separation method on another sample separation apparatus, i.e. may create for example a chromatogram which would be obtained when carrying out the separation method on the other sample separation apparatus.

In an embodiment, the processor is configured for and/or the process comprises using the determined real value of the at least one operation parameter for evaluating a sample separation result obtained by executing the sample separation method on a sample separation apparatus, in particular by a sensorless sample separation apparatus and/or by a sample separation apparatus without resources for controlling the at least one operation parameter. Another advantageous application of an exemplary embodiment of the invention is thus a sensorless sample separation apparatus which does not include hardware sensors, but in contrast to this allows operation based on sensor data delivered by the components of the test sample. For instance, an HPLC may be provided without column oven and without temperature control of a chromatographic separation column, but may simply determine the actual column temperature (for example 26° C.) from the behavior of the components of the test sample. A chromatogram may then be interpreted correspondingly.

Embodiments may be implemented in conventionally available HPLC systems, such as the analytical Agilent 1290 Infinity II LC system or the Agilent 1290 Infinity II Preparative LC/MSD system (both provided by the applicant Agilent Technologies—see www.agilent.com).

One embodiment of a sample separation apparatus comprises a pump having a pump piston for reciprocation in a pump working chamber to compress liquid in the pump working chamber to a high pressure at which compressibility of the liquid becomes noticeable. This pump may be configured to know (by means of operator's input, notification from another module of the instrument or similar) or elsewise derive solvent properties.

The sample separation unit of the sample separation apparatus preferably comprises a chromatographic column (see for instance en.wikipedia.org/wiki/Column_chromatography) providing a stationary phase. The column may be a glass or steel tube (for instance with a diameter from 50 μm to 5 mm and a length of 1 cm to 1 m) or a microfluidic column (as disclosed for instance in EP 1577012 or the Agilent 1200 Series HPLC-Chip/MS System provided by the applicant Agilent Technologies). The individual components are retained by the stationary phase differently and at least partly separate from each other while they are propagating at different speeds through the column with the eluent. At the end of the column they elute one at a time or at least not entirely simultaneously. During the entire chromatography process the eluent may be also collected in a series of fractions. The stationary phase or adsorbent in column chromatography usually is a solid material. The most common stationary phase for column chromatography is silica gel, surface modified silica gel, followed by alumina. Cellulose powder has often been used in the past. Also possible are ion exchange chromatography, reversed-phase chromatography (RP), affinity chromatography or expanded bed adsorption (EBA). The stationary phases are usually finely ground powders or gels and/or are microporous for an increased surface.

The mobile phase (or eluent) can be a pure solvent or a mixture of different solvents (such as water and an organic solvent such as ACN, acetonitrile). It can be chosen for instance to adjust the retention of the compounds of interest and/or the amount of mobile phase to run the chromatography. The mobile phase can also be chosen so that the different compounds or fractions of the fluidic sample can be separated efficiently. The mobile phase may comprise an organic solvent like for instance methanol or acetonitrile, often diluted with water. For gradient operation water and organic is delivered in separate bottles, from which the gradient pump delivers a programmed blend to the system. Other commonly used solvents may be isopropanol, tetrahydrofuran (THF), hexane, ethanol and/or any combination thereof or any combination of these with aforementioned solvents.

A fluidic sample analyzed by a sample separation apparatus according to an exemplary embodiment of the invention may comprise but is not limited to any type of process liquid, natural sample like juice, body fluids like plasma or it may be the result of a reaction like from a fermentation broth.

The pressure, as generated by the fluid drive, in the mobile phase may range from 2-200 MPa (20 to 2000 bar), in particular 10-150 MPa (150 to 1500 bar), and more particularly 50-120 MPa (500 to 1200 bar).

The sample separation apparatus, for instance an HPLC system, may further comprise a detector for detecting separated compounds of the fluidic sample, a fractionating unit for outputting separated compounds of the fluidic sample, or any combination thereof. For example, a fluorescence detector may be implemented.

Embodiments of the invention can be partly or entirely embodied or supported by one or more suitable software programs (or software), which can be stored on or otherwise provided by any kind of non-transitory medium or data carrier, and which might be executed in or by any suitable data processing unit such as an electronic processor-based computing device (or system controller, control unit, etc.) that includes one or more electronic processors and memories. Software programs or routines (e.g., computer-executable or machine-executable instructions or code) can be preferably applied in or by the control unit. For example, one embodiment of the present disclosure provides a non-transitory computer-readable medium or program element that includes instructions stored thereon, such that when executed on a processor, the instructions perform the steps of the method of any of the embodiments disclosed herein.

BRIEF DESCRIPTION OF DRAWINGS

Other objects and many of the attendant advantages of embodiments of the present invention will be readily appreciated and become better understood by reference to the following more detailed description of embodiments in connection with the accompanying drawings. Features that are substantially or functionally equal or similar will be referred to by the same reference signs.

FIG. 10 shows a simulated chromatogram corresponding to the experimental chromatogram of FIG. 9.

Figure 1:
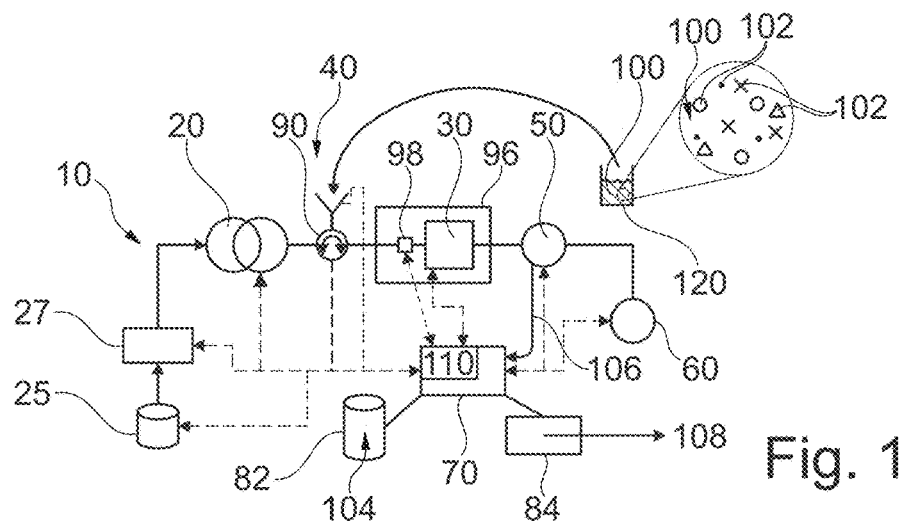
FIG. 1 shows a liquid sample separation apparatus in accordance with embodiments of the present invention, particularly used in high performance liquid chromatography (HPLC).

The illustrations in the drawings are schematic.

DETAILED DESCRIPTION

Before describing the figures in further detail, some basic considerations of the present invention will be summarized based on which exemplary embodiments have been developed.

According to an exemplary embodiment of the invention, a mix of components may be used for providing a test sample. Absolute sample separation properties, in particular chromatographic properties, of each of the components may be provided, for instance determined by carrying out calibration measurements. Advantageously, said absolute sample separation properties may be device-independent, i.e. independent of properties of a sample separation apparatus on which a (for instance chromatographic) separation method using the test sample is carried out. The test sample may then be used for carrying out experimentally a separation method on a sample separation apparatus for separating the test sample, which allows to obtain a real separation result (in particular a measured chromatogram for the test sample). By comparing the obtained separation result with the absolute sample separation properties, one or more actual or real values of each of one or more operation parameters (for instance temperature, flowrate, gradient profile) may then be derived for characterizing the actual course of the separation method executed on the sample separation apparatus. For instance, this may be accomplished by a software routine, which may be executed on a sample separation apparatus or separately therefrom (for instance installed on a dedicated device, provided in form of an app, and/or stored on a cloud). Descriptively speaking, the components of the test sample may function as sensors for the operation parameters, wherein the real separation result can be considered as sensor data. Interior hardware sensors of a sample separation apparatus may thus be dispensable or may be supplemented by complementary sensor data provided by the components of the test sample.

More specifically, an exemplary embodiment provides a test sample in form of a specific mixture of several standard components. It may be possible, preferably by simulation, to determine an ideal chromatogram for the test sample when separated by a separation method on a sample separation apparatus. Comparing such an ideal chromatogram with a real chromatogram, obtained when experimentally executing the separation method for separating the test sample on a sample separation apparatus, may allow to correlate an identified deviation between the chromatograms with a deviation of one or more real operational parameter values with regard to ideal values. In other words, analyzing such variations may allow a performance rating, temperature sensing, flowrate sensing, etc. More specifically, the composition of the test sample and its individual components may provide information concerning performance and/or parameter values.

A fit (preferably on the basis of a finite element analysis, FEM) may then allow to determine the flowrate value, temperature value, or gradient profile/solvent composition from the retention time behavior. For instance, it may be possible to determine the behavior of the components and to carry out the fit in such a way that the operation parameters (such as temperature, flowrate, and/or gradient profile) are fit parameters. The determined real value of the respective operational parameter may then correspond to the fit parameter providing a best match with the experimentally obtained real sample separation result. In particular, an experimentally measured chromatogram may be fitted with respect to a simulated chromatogram. The experimental chromatogram may be measured once, and the simulated chromatogram may be determined repeatedly or iteratively with varying values of the operation parameters(s) until a best match or a sufficiently good match (for instance meeting a threshold criterion) with the experimentally measured chromatogram is achieved.

According to an exemplary embodiment of the invention, an absolute chromatographic checkout for use as a sensor, diagnostic, and/or emulation tool can be provided. In particular, a test mix (i.e. a test sample comprising a plurality of sample components) may be used as a flow sensor, temperature sensor, and/or to determine a gradient accuracy. The test mix may also be used to characterize a sample separation apparatus, determine separation method transfer parameters, and/or as a precise diagnostic tool, and/or as a sensor replacement for modular operational qualification tests. Advantageously, external sensors for testing chromatographic systems against their operational specifications being expensive, requiring metrological experience to operate, and needing maintenance and recalibration may thus become dispensable.

Advantageously, an absolute chromatographic checkout according to an exemplary embodiment of the invention may use information concerning a test mix relating to how each component or standard interacts during a separation run by the sample separation apparatus. With a full characterization of the test mix, absolute values can be obtained and compared with a behavior of the sample separation apparatus. For example, this may allow the determination of flowrate, column temperature, gradient accuracy, etc., based upon a mathematical algorithm.

Advantageously, embodiments of the invention help to determine the performance of a chromatographic system without the use of external sensors. Furthermore, embodiments of the invention allow chromatographic methods to be transferred to various system set-ups. Embodiments of the invention can be used as well as a precise diagnostic tool. In particular, embodiments of the invention can be used to replace the use of external sensors for operational qualifications. Additionally or alternatively, an embodiment can be used to create a precise emulation of a different chromatographic system.

An absolute checkout can be performed by determining how each component or standard within the mixed test sample interacts with each other, with the sample separation apparatus, and in particular with a chromatographic separation column under various temperature conditions. This information may provide a basis for executing an algorithm to determine what chromatogram should result from specific separation method parameters and set-up of a sample separation apparatus. Advantageously, a checkout gained with absolute method parameters (such as flow, composition, temperature) allows to compare instruments with absolute performance parameters. A reference to results declared as "good" reference is not needed. Furthermore, the knowledge of absolute performance of different sample separation apparatuses allows to calculate a method transfer from one sample separation apparatus to another sample separation apparatus, and vice versa.

A gist of an exemplary embodiment of the invention is to provide a dedicated sample mixture or test sample and to determine an ideal chromatogram for such a test sample, i.e. a chromatogram as it would be obtained from an ideal sample separation apparatus in which all set operation parameter values equal one hundred percent with the actual conditions. For example, an actual flowrate, temperature, composition, etc., of the solvent composition and the sample separation apparatus is exactly the flowrate, temperature, composition, etc. as set by a separation method. Comparing a real chromatogram (as determined experimentally with a real sample separation apparatus for the dedicated sample mixture) with the ideal chromatogram (for that test sample) allows to determine a deviation of the real parameter from the ideal parameter (for example an actual temperature of 68° C. while the sample separation apparatus shows "70° C."). Exemplary applications of embodiments of the invention are a check procedure whether a sample separation apparatus is within the specification, a method transfer from one sample separation apparatus to another sample separation apparatus, etc. For example, embodiments of the invention can be implemented as a dedicated software (for instance a program element) which may be installed in the sample separation apparatus itself, which may be a separate control software, or which may be a web application, etc.

Highly advantageously, exemplary embodiments may use a well-defined test sample (which may function as a gold standard) to determine deviations in the actual HPLC measurement setup. Certain parameter variations may be measured using the defined multi-component test sample, for example chromatograms are derived for the test sample at a plurality of different temperatures. This may allow deriving a model for the sample separation apparatus (in particular a liquid chromatography device such as an HPLC). During normal operation of the sample separation apparatus, the defined test sample may be used from time to time in order to determine the actual state of the sample separation apparatus by comparing with the model.

Referring now in greater detail to the drawings, FIG. 1 depicts a general schematic of a liquid separation system as example for a sample separation apparatus 10 according to an exemplary embodiment of the invention. A fluid drive 20 (such as a piston pump) receives a mobile phase from a solvent supply 25 via degassing unit 27, which degases and thus reduces the amount of dissolved gases in the mobile phase. The fluid drive 20 drives the mobile phase through a separation unit 30 (such as a chromatographic column) comprising a stationary phase. A sampler or injector 40, implementing a fluidic valve 90, can be provided between the fluid drive 20 and the separation unit 30 in order to subject or add (often referred to as sample introduction) a sample fluid into the mobile phase so that a fluidic sample and mobile phase may be provided towards a separation path where actual sample separation occurs. The stationary phase of the separation unit 30 is configured for separating compounds of the sample liquid. A detector 50 is provided for detecting separated compounds of the sample fluid. A fractionating unit 60 can be provided for outputting separated compounds of sample fluid. It is also possible to provide a waste (not shown).

While the mobile phase can be comprised of one solvent only, it may also be mixed from plural solvents. Such mixing may be a low pressure mixing and provided upstream of the fluid drive 20, so that the fluid drive 20 already receives and pumps the mixed solvents as the mobile phase. Alternatively, the fluid drive 20 may comprise plural individual pumping units, with plural of the pumping units each receiving and pumping a different solvent or mixture, so that the mixing of the mobile phase (as received by the separation unit 30) occurs at high pressure and downstream of the fluid drive 20 (or as part thereof). The composition of the mobile phase may be kept constant over time, the so called isocratic mode, or varied over time, the so called gradient mode.

A data processing unit or control unit 70, which can be a PC or workstation, and which may comprise one or more processors 110, may be coupled (as indicated by the dotted arrows) to one or more of the devices in the sample separation apparatus 10 in order to receive information and/or control operation. For example, the control unit 70 may control operation of the fluid drive 20 (for example setting control parameters) and receive therefrom information regarding the actual working conditions (such as output pressure, etc. at an outlet of the pump 20). Optionally, the control unit 70 may also control operation of the solvent supply 25 (for example setting the solvent/s or solvent mixture to be supplied) and/or the degassing unit 27 (for example setting control parameters and/or transmitting control commands) and may receive therefrom information regarding the actual working conditions (such as solvent composition supplied over time, vacuum level, etc.). The control unit 70 may further control operation of the sampling unit or injector 40 (for example controlling sample injection or synchronization of sample injection with operating conditions of the fluid drive 20). The separation unit 30 may also be controlled by the control unit 70 (for example selecting a specific flow path or column, setting operation temperature, etc.), and send—in return—information (for example operating conditions) to the control unit 70. Accordingly, the detector 50 may be controlled by the control unit 70 (for example with respect to spectral or wavelength settings, setting time constants, start/stop data acquisition), and send information (for example about the detected sample compounds) to the control unit 70. The control unit 70 may also control operation of the fractionating unit 60 (for example in conjunction with data received from the detector 50) and provide data back.

The above described sample separation unit 30, here configured as chromatographic separation column, is arranged inside of a temperature control chamber 96, such as a column oven. Fluidic sample and/or mobile phase pumped by the fluid drive 20 may be preheated in a preheater assembly 98 arranged upstream of the sample separation unit 30 inside of the temperature control chamber 96.

The control unit 70 and the processor 110 may be coupled with a database 82 (such as an electronic mass storage device, for instance a hard disk) with read and/or write access. In the database 82, information used by the control unit 70 and its processor 110 for carrying out the below described computations, and in particular simulations, may be stored. Stored data may include calibration data such as absolute sample separation properties of sample components 102 of a below described test sample 100, data sets relating to one or more separation methods, data relating to theoretical models and/or empirical data, etc. Furthermore, the control unit 70 is coupled with an input/output unit 84 by which a user can communicate with the sample separation apparatus 10. For instance, information (for example a determined real value 108 of an operation parameter, etc.) may be displayed to the user on a display of the input/output unit 84. Beyond this, the input/output unit 84 may comprise input elements, such as a touchscreen, a keypad, etc. Via the input elements, a user may input commands (for instance a command to start a separation run) and/or parameter values (such as a desired flowrate).

The control unit 70, and in particular its processor 110, may be configured for carrying out a software-controlled process which will be described in the following. As a basis for the execution of the process, a test sample 100 is provided which comprises a mix of a plurality of pre-known sample components 102 (illustrated schematically in FIG. 1 as dots, circles, crosses and triangles). For instance, the test sample 100 may be provided in a container 120 (such as a vial) and may be injected, via injector 40, for separation by the sample separation apparatus 10. As a basis for the execution of the process, it is further possible to provide absolute sample separation properties 104 for each of the sample components 102. In the shown embodiment, the absolute sample separation properties 104 are stored as data sets in database 82. Descriptively speaking, the absolute sample separation properties 104 may specify, for each component 102 individually, the behavior of a respective component 102 in relation to a chromatographic separation. For example, the absolute sample separation properties 104 may indicate retention times of a respective component 102 for different values of temperature, flowrate, etc. during a chromatographic separation run. Coming back to the process, the latter comprises experimentally determining a real sample separation result 106 by executing a sample separation method for separating the test sample 100 by the sample separation apparatus 10. Thus, a chromatographic separation measurement is carried out using test sample 100 in the liquid chromatography-type sample separation apparatus 10 according to FIG. 1 and executing a gradient run on the basis of a certain chromatographic separation method. A chromatogram may be measured by detector 50 and may be supplied, as the real sample separation result 106, to the control unit 70 and/or to the processor 110. The processor 110 may then process the real sample separation result 106 together with the absolute sample separation properties 104 to thereby determine a real value 108 of one or more operation parameters (such as an actual temperature and/or an actual flowrate of mobile phase in sample separation unit 30). More specifically, this determination may comprise a simulation-based comparison between the absolute sample separation properties 104 and the real sample separation result 106 for characterizing a real course of the sample separation method. For instance, the real value 108 may be output to a user via input/output unit 84.

Advantageously, the chromatography-related absolute sample separation properties 104 may be independent of apparatus properties of the sample separation apparatus 10 by which the sample components 102 are separated, i.e. may be device-independent universal calibration data depending only on component attributes. Consequently, the absolute sample separation properties 104 need to be determined only once, and can then be stored and used for any sample separation apparatus 10 without recalibration.

In the context of determining the actual or real value 108 (for instance an actual temperature in the stationary phase of the sample separation unit 30 during separation), which may deviate from a corresponding target or ideal value as defined by the chromatographic separation method due to a non-ideal behavior of sample separation apparatus 10 when measuring real sample separation result 106, the process executed by processor 110 may comprise determining an ideal sample separation result. Such an ideal separation result may be calculated numerically by processor 110, for instance on the basis of an FEM simulation. In particular, it may be possible to determine the ideal sample separation result by simulating execution of the sample separation method for separating the test sample 100 by the sample separation apparatus 10 using the absolute sample separation properties 104. In this context, the process executed by processor 110 may repeatedly determine an ideal sample separation result in an iterative way by simulating execution of the sample separation method with different values of the respective operation parameter. More specifically, the processor 110 may calculate, as ideal sample separation result, theoretical or simulated chromatograms which would be obtained when executing the separation method for separating the test sample 100 on the sample separation apparatus 10 with certain operation parameters (such as temperature, flowrate, gradient profile) under the assumption of an ideal behavior. The assumption of an ideal behavior may disregard phenomena such as mobile phase leakage, thermal delay, friction, interaction with the environment of the sample separation apparatus 10, etc. The process executed or controlled by processor 110 may then determine the real value 108 of the respective operation parameter as the value of the operation parameter which corresponds to the one of the ideal sample separation results showing the best match with the real sample separation result 106 among all repeatedly and iteratively determined ideal sample separation results. In other words, a fitting routine may identify the simulated chromatogram showing the best match (for instance in a least-squares fit) with the measured chromatogram constituting the real sample separation result 106. The one or more operation parameter values corresponding to the best match of the fit may then be output as the real value 108.

For example, the separation method may specify an ideal or target value of the temperature at the sample separation unit 30 during execution of the separation method of 80° C. The fit of the actually measured chromatogram to the simulated chromatograms may however lead to a best match for a real temperature value at the sample separation unit 30 during execution of the separation method of 76° C. The latter value may be output as a real value 108 to indicate to the user via input/output unit 84 that the operation of the sample separation apparatus 10 shows an actual deviation of the column temperature of 4° C. from the target value defined by the separation method.

Thus, the function of processor 110 may provide information concerning an operational qualification or performance indicator allowing to conclude whether or not the actual operation of the sample separation apparatus 10 complies with a predefined specification, for instance whether a deviation of the column temperature of 4° C. is still acceptable or not.

Descriptively speaking, the components 102 may function as absolute device-independent sensors for operation parameters such as temperature, flowrate, or solvent composition during a gradient run, and may thus render hardware sensors dispensable. Thus, the described process enables a sensorless sample separation apparatus 10.

Further possible applications of the described process are a separation method transfer between different sample separation apparatuses 10, an emulation of a separation performance of one sample separation apparatus 10 on another one, a diagnosis of a potential malfunction of the sample separation apparatus 10 or a member thereof, etc.

Figure 2:
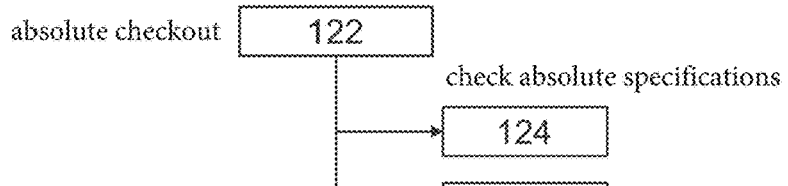
FIG. 2 shows a scheme of a process for execution on a sample separation apparatus according to an exemplary embodiment.

FIG. 2 shows a scheme of a process for execution on a sample separation apparatus 10 according to an exemplary embodiment.

As can be taken from reference sign 122, the architecture according to an exemplary embodiment of the invention allows to carry out an absolute checkout of any sample separation apparatus 10 without variants. Inter alia, this may make possible a check of absolute specifications of the sample separation apparatus 10 (see block 124), and/or a simple determination of parameters for a transfer of a separation method between different sample separation apparatuses 10 (see block 126).

Referring to FIG. 3 to FIG. 18, detailed examples concerning an absolute characterization of a test sample 100 comprising a plurality of components 102 will be explained. In particular an accurate temperature control (for instance using a water bath, in which a sample separation unit 30 may be placed during calibration) allows characterization of the components 102. During calibration, each compound or component 102 of the assembly 100 can be eluted isocratically (i.e. with constant solvent composition) and with multiple temperatures.

Figure 3:
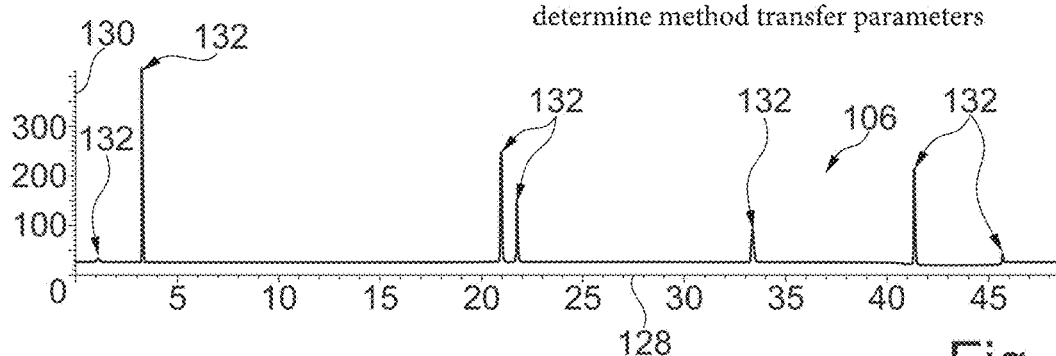
FIG. 3 shows an experimental chromatogram of a test sample comprising a mix of a plurality of pre-known sample components measured by a sample separation apparatus according to an exemplary embodiment.

FIG. 3 shows an experimental chromatogram of a test sample 100 comprising a mix of a plurality of pre-known sample components 102 measured by a sample separation apparatus 10 according to an exemplary embodiment.

More specifically, the measured chromatogram of FIG. 3 relates to a separation of a test sample 100 comprising seven components 102 when executing a certain chromatographic separation method on a chromatographic sample separation apparatus 10. Such a measured chromatogram may be used as experimentally determined sample separation result 106. Along an abscissa 128, a retention time is plotted. Along an ordinate 130, a signal (for instance an intensity) as detected by a detector 50 is plotted. The seven peaks 132 in FIG. 3 correspond to the seven components 102 of the test sample 100.

Figure 4:
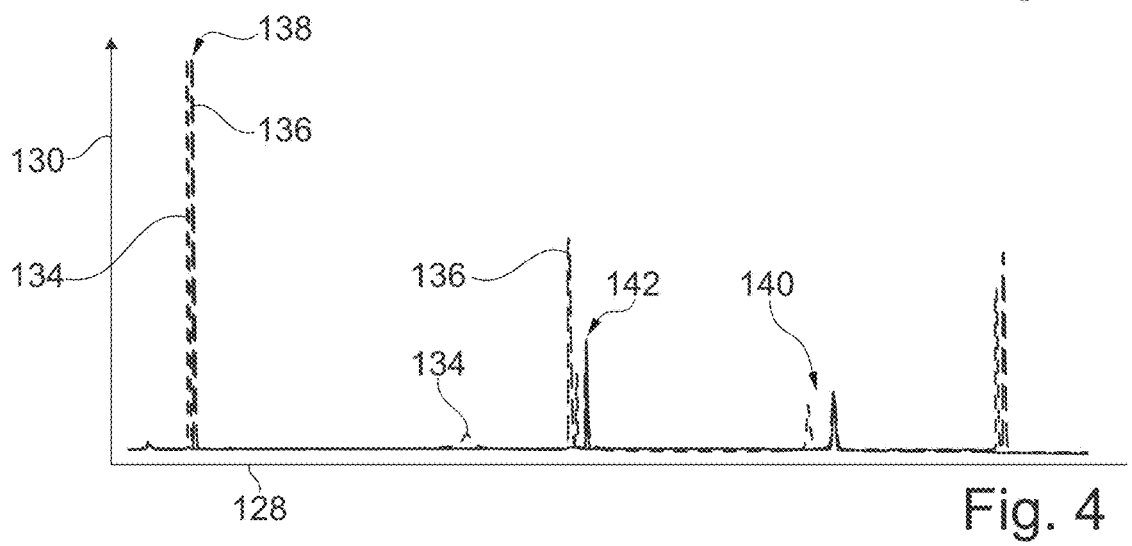
FIG. 4 shows an experimental chromatogram and a simulated chromatogram of a test sample comprising a mix of a plurality of pre-known sample components having different chromatographic characteristics according to an exemplary embodiment.

FIG. 4 shows an experimental chromatogram 134 and a simulated chromatogram 136 of the test sample 100 comprising a mix of seven pre-known sample components 102 having different chromatographic characteristics according to an exemplary embodiment. As can be seen, there is a slight discrepancy between the chromatograms 134, 136.

Now referring to reference sign 138, a first group of peaks relating to the test sample 100 correspond to early eluting sample components 102 having absolute sample separation properties 104 with pronounced flowrate dependence. Therefore, the first group of early eluting sample components 102 is specifically sensitive to the flowrate and can thus be used as fluidic flowrate sensors or probes.

Now referring to a reference sign 140, a second group of peaks relating to the test sample 100 correspond to late eluting sample components 102 having absolute sample separation properties 104 with pronounced temperature dependence. Therefore, the second group of late eluting sample components 102 is specifically sensitive to the temperature and can thus be used as fluidic temperature sensors or probes.

Now referring to a reference sign 142, a third group of peaks relating to the test sample 100 correspond to sample components 102 with elution speed between the early eluting sample components 102 and the late eluting sample components 102 having absolute sample separation properties 104 with pronounced dependence on a gradient profile. Therefore, the third group of sample components 102 with intermediate elution speed is specifically sensitive to the solvent composition and can thus be used as fluidic gradient sensors or probes.

Hence, the test sample 100 with the components 102 (the latter serving as a plurality of external standards) according to FIG. 4 is a sample mix functioning as an internal probe for flow/delay volume, gradient precision and temperature. It may be possible to qualify test sample 100 in an absolute way to gain absolute values on the behavior of an instrument. If the instrument is known as to what concerns simulation of its real behavior, re-qualification on system variants may be dispensable. One or more components 102 may function as an internal temperature probe. Methods with frictional heating may be carried out as well. In embodiments, the test sample 100 may also be used as a method compatibility tracer. Furthermore, one or more method transfer parameters can be predicted over a wide range. The performance of a pump with multiple solvent inlets may strongly depend on the construction in a complex way. A mix of several components 102 of test sample 100 may allow to measurement of the performance within a chromatographic environment. A Coriolis sensor may be added to increase precision. Hence, one or more hardware sensors may or may not be implemented in the sample separation apparatus 10 when the described test sample 100 is implemented as fluidic sensor. In embodiments, a sample run at a remote side of a user can be analyzed in an absolute way, for instance in terms of possible defects. Thus, the mixed test sample 100 may function as a standard for determining flow volume, delay volume, gradient precision, and/or temperature.

Advantages of embodiments over sample separation apparatuses 10 using hardware sensors for determining values of operation parameters are that exemplary embodiments may determine the operational behavior under chromatographic conditions and thus may be very precise, and that there is no need for external sensors or recalibration. Furthermore, a user may be provided with the option to carry out a one-click operational qualification test suite (without the need to install and/or de-install sensors).

Figure 5:
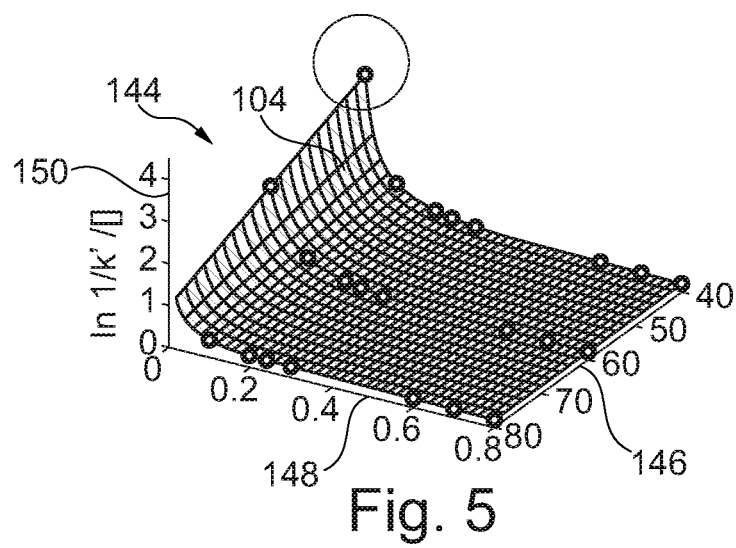
FIG. 5 shows a three-dimensional diagram illustrating absolute sample separation properties of a component of a mix according to an exemplary embodiment.
Figure 6:
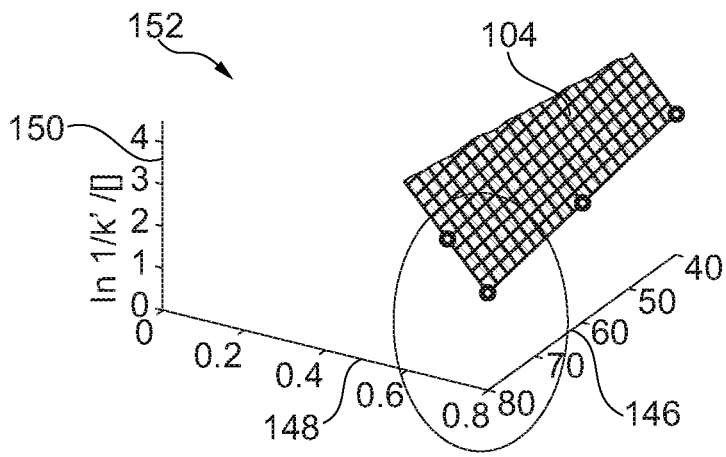
FIG. 6 shows a three-dimensional diagram illustrating absolute sample separation properties of another component of a mix according to an exemplary embodiment.
Figure 7:
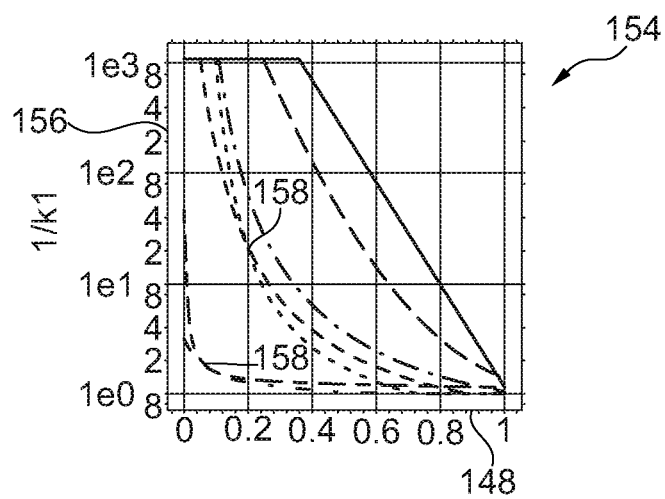
FIG. 7 shows a two-dimensional diagram illustrating absolute sample separation properties of different components of a mix according to an exemplary embodiment.

Now referring to FIG. 5 to FIG. 7, embodiments may determine the absolute sample separation properties 104 of the components 102 of the mixed test sample 100 by executing calibration measurements for each of the sample components 102 by varying a plurality of operation parameters during calibration. More specifically, the calibration measurements may be executed by varying operation parameters such as temperature of the respective sample component 102, flowrate of a mobile phase by which the respective sample component 102 is transported and/or separated, composition of a mobile phase by which the respective sample component 102 is transported and/or separated (in particular varying a corresponding gradient profile). Advantageously, the calibration measurements may be carried out in an isocratic mode, i.e. with a constant solvent composition of a mobile phase. Thus, a plurality of chromatograms may be measured in an isocratic mode for each of the components 102 of the test sample 100. For instance, the temperature may be varied, the solvent composition may be varied, the flowrate may be varied, etc., in the various chromatograms. Said chromatograms may be used as calibration information delivering absolute sample separation properties 104 for each of the sample components 102. FIG. 5 to FIG. 7 illustrate absolute sample separation properties 104 as obtained from absolute calibration runs in an isocratic mode for the test sample 100 according to FIG. 3 and FIG. 4.

FIG. 5 shows a three-dimensional diagram 144 illustrating absolute sample separation properties 104 of an early eluting component 102 (nortryptyline hydrochloride) of a mix according to an exemplary embodiment. Temperature is plotted along an axis 146, and a percentage of an organic solvent of a mobile phase is plotted along an axis 148. Along an axis 150, the natural logarithm of a reduced retention factor k' is plotted. Descriptively speaking, retention times become larger in an upward direction of axis 150. Hence, FIG. 5 shows the result of an absolute calibration obtained from isocratic runs for one component 102 of test sample 100. Descriptively speaking, absolute sample separation properties 104 of a respective component 102 are illustrated as a spatial response surface.

FIG. 6 shows a three-dimensional diagram 152 illustrating absolute sample separation properties 104 of a late eluting component 102 (di-octylphthalate) of a mix according to an exemplary embodiment. The spatial response surface according to FIG. 6 shows a strong temperature dependency. For determining the corresponding calibration information, it may be possible to use a mass spectrometer as an additional detector (in particular for peak identification).

FIG. 7 shows a two-dimensional diagram 154 illustrating absolute sample separation properties of seven different components 102 of a mix according to an exemplary embodiment. Diagram 154 has an ordinate 156 plotting a parameter indicative of the retention time. The different curves in diagram 154 relate to the different components 102 of the test sample 100 and indicate their individual experimental behavior depending on a certain parameter (in the shown case the percentage of an organic solvent). FIG. 7 illustrates a projection of a response surface at a temperature of 80° C.

Challenges may arise where different curves of diagram 154 intersect (e.g., at 158), and where different components 102 may swap their elution position. This may involve difficulties concerning a possible inhibited automatic analysis in view of an interaction between different eluates. This may occur for instance when an eluate is buffer sensitive. Two eluates may then switch positions in an eluent. Such issues may be overcome when using a mass spectrometer as detector. It may also be helpful to divide a test sample 100 with a large number of components 102 in two or more different test samples each having smaller number of components.

Figure 8:
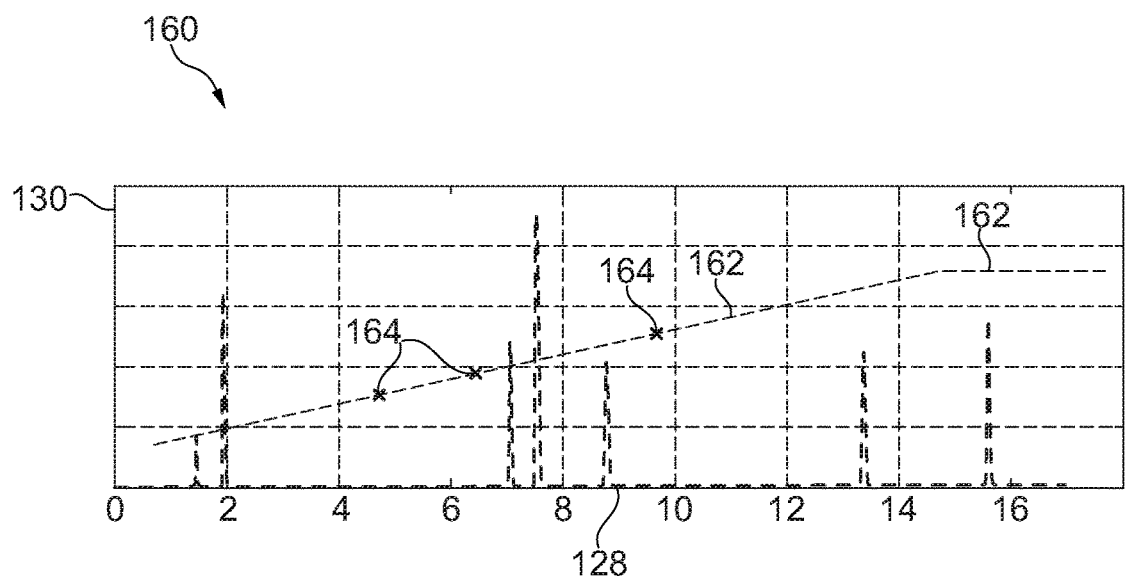
FIG. 8 shows a gradient profile and a correspondingly simulated chromatogram of a test sample comprising a mix of a plurality of pre-known sample components having different chromatographic characteristics simulated for a sample separation apparatus according to an exemplary embodiment.

FIG. 8 shows a simulated chromatogram 160 of a test sample 100 comprising a mix of a plurality of pre-known sample components 102 having different chromatographic characteristics simulated for a sample separation apparatus 10 according to an exemplary embodiment. FIG. 8 also shows a gradient profile 162 according to a chromatographic separation method used for separating the test sample 100 by a chromatographic sample separation apparatus 10. The chromatogram 160 may be obtained when simulating execution of the separation method for separating the components 102 of the test sample 100 by sample separation apparatus 10 using the illustrated gradient profile 162. The illustrated simulation may use calibration results from the above described isocratic measurements. Descriptively speaking, each data point 164 on the gradient profile 162 may be assigned to a specific isocratic measurement. Hence, in view of the absolute calibration of the test sample 100 and its components 102, a simulation of the chromatogram 160 based on the calibration data and the gradient profile 162 can be carried out.

Figure 9:
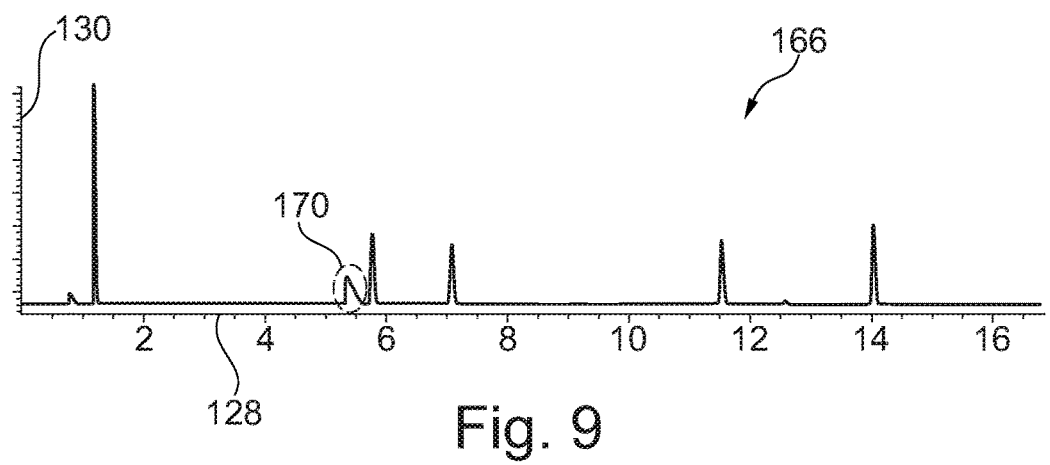
FIG. 9 shows an experimental chromatogram and FIG. 10 shows a simulated chromatogram of a test sample comprising a mix of a plurality of pre-known sample components having different chromatographic characteristics according to an exemplary embodiment.
Figure 10:
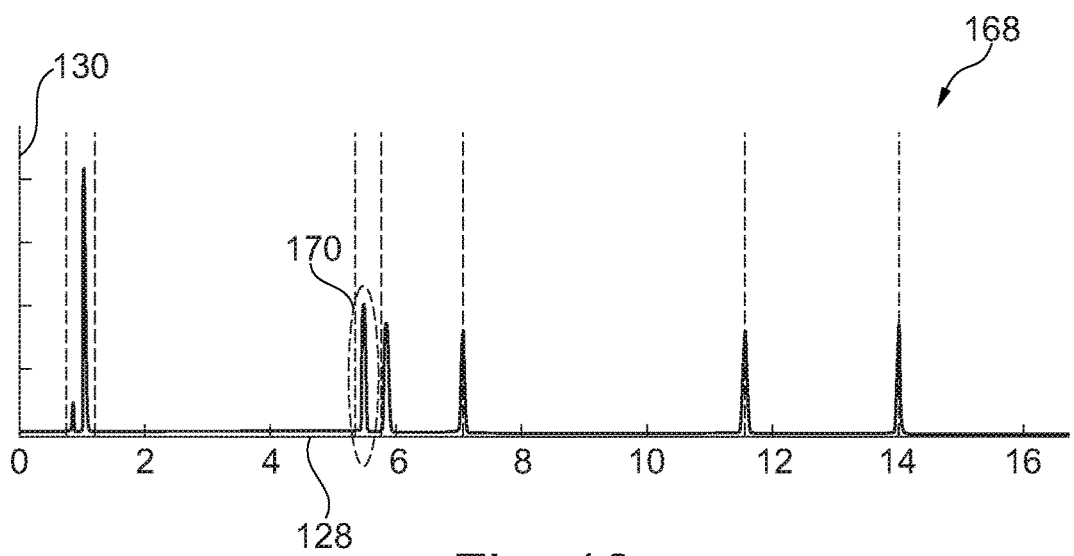

FIG. 9 shows an experimental or measured chromatogram 166 and FIG. 10 shows a simulated chromatogram 168 of a test sample 100 comprising a mix of a plurality of pre-known sample components 102 having different chromatographic characteristics according to an exemplary embodiment. Hence, FIG. 10 illustrates a simulation of a gradient run for separating the test sample 100 on a sample separation apparatus 10. FIG. 9 illustrates the result of a measured gradient run with the same setup, i.e. on the basis of the same separation method and using the same sample separation apparatus 10. Despite small variations in a region 170 (which may be due to artifacts resulting from a pH-dependency of the fluids), a proper correspondence can be identified between the measured chromatogram 166 and the simulated chromatogram 168. Thus, it can be concluded that the values of a set of operation parameters (for instance a temperature of 68° C. and a flowrate of 0.9 ml/min, etc.) used for determining the simulated chromatogram 168 are proper fitting parameters for fitting the measured chromatogram 166. Consequently, it can be concluded that these operation parameters are the real values 108 in sample separation apparatus 10 when measuring chromatogram 166. If for example target operation parameters of 70° C. and a flowrate of 1 ml/min, etc. were defined in the separation method, it can be analyzed whether the detected deviations are still within or are already outside of the specification of the sample separation apparatus 10.

Figure 11:
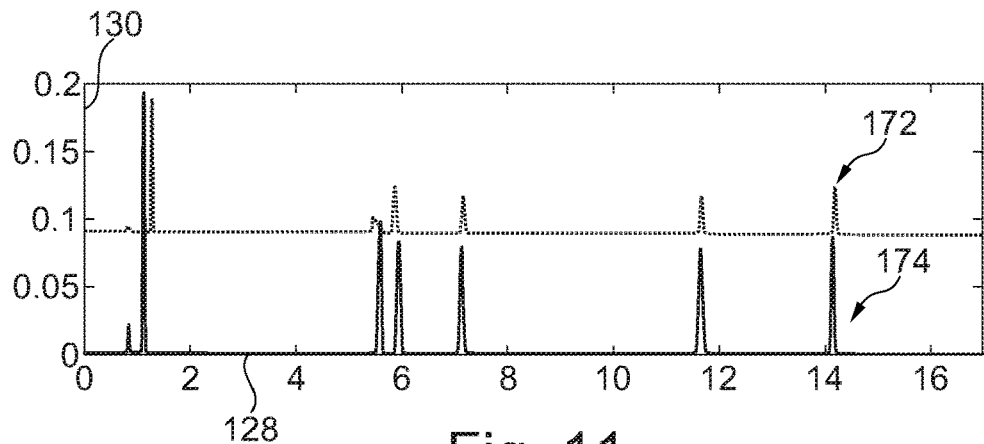
FIG. 11 shows an experimental chromatogram using a first predefined temperature and shows a simulated chromatogram using a second simulated temperature of a test sample comprising a mix of a plurality of pre-known sample components having different chromatographic characteristics according to an exemplary embodiment.

FIG. 11 shows an experimental chromatogram 172 using a first predefined temperature (for example 80° C.) and shows a simulated chromatogram 174 using a second simulated temperature (for example 76±1° C.) of a test sample 100 comprising a mix of a plurality of pre-known sample components 102 having different chromatographic characteristics according to an exemplary embodiment. The test sample 100 (and in particular a subset of its components 102) may be used as a temperature sensor. A proper correspondence between simulation and measurement can be achieved when assuming a real temperature of 76° C., i.e. a deviation of 4° C. from a target temperature of 80° C. according to the defined chromatographic separation method.

Figure 12:
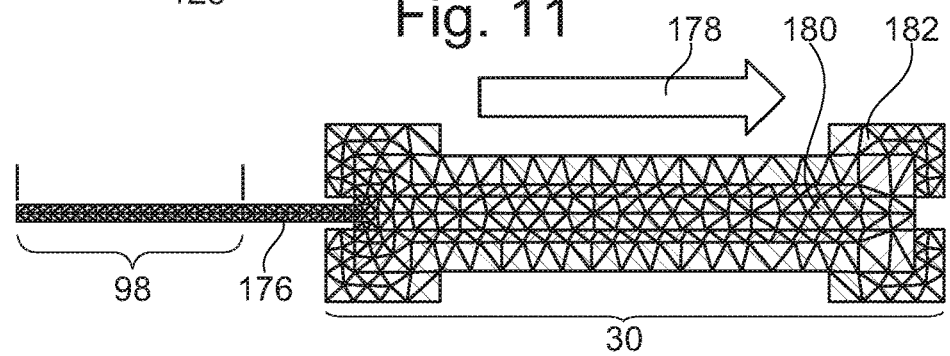
FIG. 12 shows a sample separation unit for a sample separation apparatus subjected to a finite element simulation according to an exemplary embodiment.

FIG. 12 shows a model of a sample separation unit 30 for a sample separation apparatus 10 used as a basis for a finite element simulation (FEM) according to an exemplary embodiment. The FEM analysis according to FIG. 12 models the environment of the chromatographic separation column used as a sample separation unit 30. Said environment comprises preheater assembly 98 and a capillary 176. The sample separation unit 30 itself may be modeled by a stationary phase 180, surrounded by a casing 182. A flow direction of a fluidic sample and a mobile phase during separation is denoted with reference sign 178. The illustrated model allows the use of components 102 of the test sample 100 for a temperature measurement, when assuming a certain flowrate (of for example 1 ml/min). Temperature determination may be carried out as described referring to FIG. 11.

Figure 13:
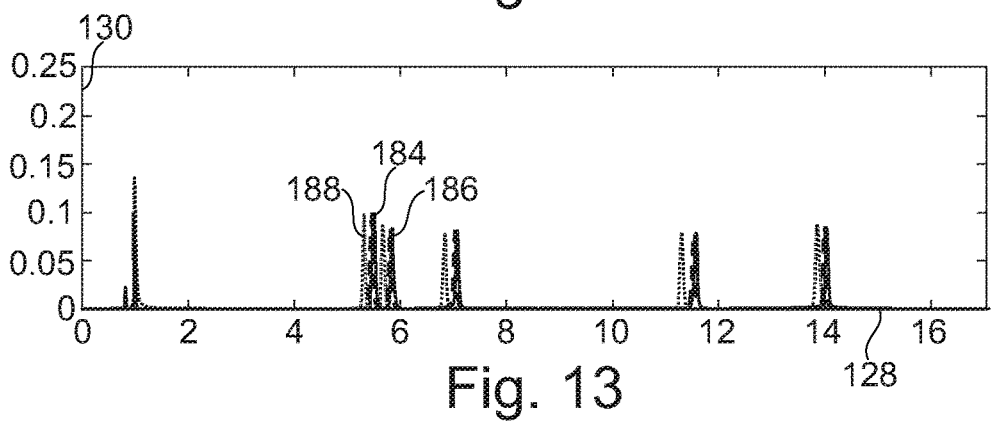
FIG. 13 shows different simulated chromatograms of a test sample comprising a mix of a plurality of pre-known sample components having different chromatographic characteristics according to an exemplary embodiment.
Figure 14:
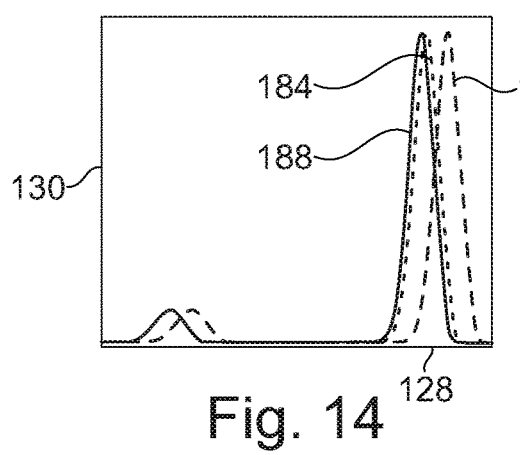
FIG. 14 shows a detail of the chromatograms of FIG. 13 illustrating that a flow error affects all peaks.
Figure 15:
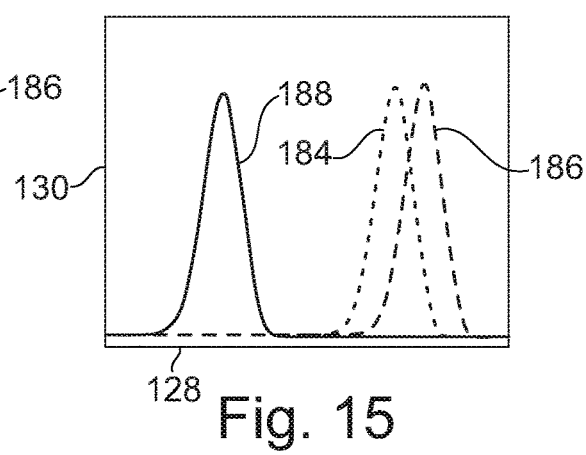
FIG. 15 shows another detail of the chromatograms of FIG. 13 illustrating that a gradient error affects all peaks.

FIG. 13 shows different simulated chromatograms 184, 186, 188 of a test sample 100 comprising a mix of a plurality of pre-known sample components 102 having different chromatographic characteristics according to an exemplary embodiment. Chromatogram 184 serves as a reference. Chromatogram 186 is obtained when changing the flowrate by −2%. Chromatogram 188 is obtained when changing the gradient by +2%. Thus, FIG. 13 shows that the test sample 100 used for the shown simulations may be used as flow sensor and/or gradient sensor. FIG. 14 shows a detail of the chromatograms of FIG. 13 illustrating that a flow error affects all peaks. FIG. 15 shows another detail of FIG. 13 illustrating that a gradient error affects all peaks.

Figure 16:
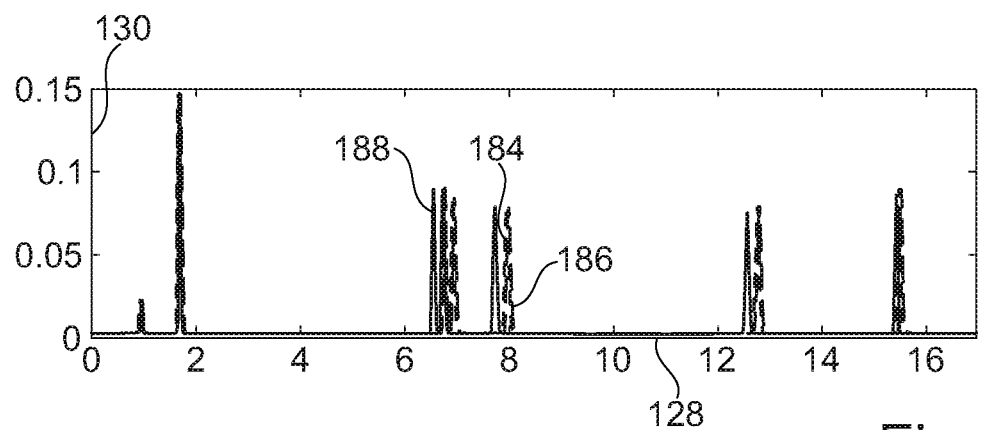
FIG. 16 shows chromatograms of a test sample comprising a mix of a plurality of pre-known sample components having different chromatographic characteristics according to an exemplary embodiment configured as a flow and gradient sensor.

FIG. 16 shows chromatograms 184, 186, 188 of a test sample 100 comprising a mix of a plurality of pre-known sample components 102 having different chromatographic characteristics according to an exemplary embodiment configured as a flow and gradient sensor. While FIG. 16 corresponds to a temperature of 40° C., FIG. 13 corresponds to a temperature of 80° C.

Figure 17:
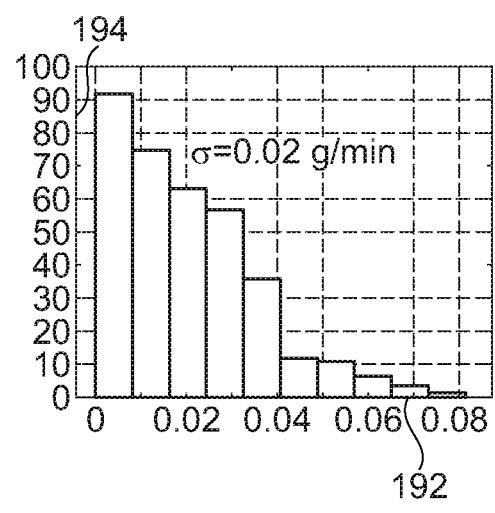
FIG. 17 shows a diagram used for solvent management of a sample separation apparatus according to an exemplary embodiment.

FIG. 17 shows a diagram 190 used for solvent management of a sample separation apparatus 10 according to an exemplary embodiment. An abscissa 192 plots a drift (in g/cm), whereas an ordinate 194 plots a frequency. Diagram 190 shows a drift per time error distribution.

According to FIG. 17, embodiments of the invention may also be used for solvent management and/or level sensing. A load cell mass of 5 kg is assumed. The setup uses a built-in analog-to-digital converter (ADC) from a degasser pressure measurement. The ADC has 16 bit and runs at 125 Hz (which may correspond to non-ideal operating conditions since the analog circuitry is not intended for this use).

Figure 18:
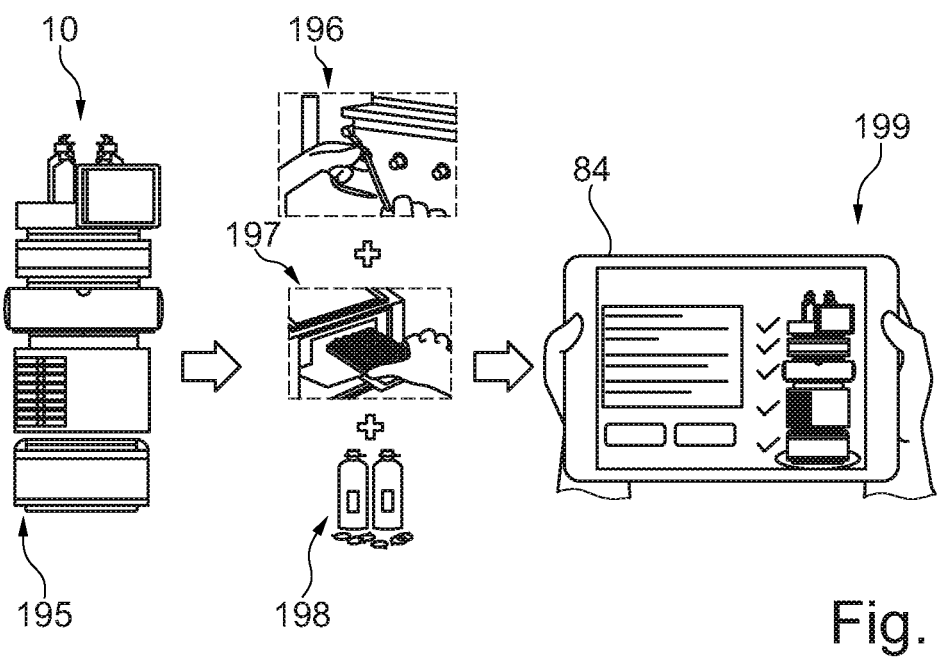
FIG. 18 shows different details of a sample separation apparatus operated according to an exemplary embodiment.

Under these conditions, tests show a drift of 21 mg/min which allows an identification of solvents. A specification of the load cell may be 8 mg/min, so that flow accuracy is measurable (for instance in the range from 10 µl/min to 50 µl/min). The drift may be smaller than or equal to 4 mg/min, so that composition accuracy is measurable FIG. 18 shows different details of a sample separation apparatus 10 according to an exemplary embodiment. More specifically, FIG. 18 illustrates how an automatic test of operational qualification may be carried out by a sample separation apparatus 10.

Reference sign 195 illustrates that the liquid chromatography-type sample separation apparatus 10 may be tested as a system. A user may install an operational qualification-specific sample separation unit 30, see reference sign 196. As shown with reference sign 197, the user may insert a consumable sample tray. Moreover, the user may attach pre-made solvents, see reference sign 198. Then, the above-described process is carried out in order to determine whether the sample separation apparatus 10 complies with a predefined specification, or not, and thus passes or fails the operational qualification, see reference sign 199. If the test fails, the program will immediately stop and inform the user of actions needed, including the creation of a deviation from the protocol. The result of the test may be displayed on input/output unit 84.

It should be noted that the term "comprising" does not exclude other elements or features and the term "a" or "an" does not exclude a plurality. Also elements described in association with different embodiments may be combined. It should also be noted that reference signs in the claims shall not be construed as limiting the scope of the claims.

It will be understood that one or more of the processes, sub-processes, and process steps described herein may be performed by hardware, firmware, software, or a combination of two or more of the foregoing, on one or more electronic or digitally-controlled devices. The software may reside in a software memory (not shown) in a suitable electronic processing component or system such as, for example, the control unit 70 and/or processor 110 schematically depicted in FIG. 1. The software memory may include an ordered listing of executable instructions for implementing logical functions (that is, "logic" that may be implemented in digital form such as digital circuitry or source code, or in analog form such as an analog source such as an analog electrical, sound, or video signal). The instructions may be executed within a processing module, which includes, for example, one or more microprocessors, general purpose processors, combinations of processors, digital signal processors (DSPs), field-programmable gate arrays (FPGAs), or application specific integrated circuits (ASICs). Further, the schematic diagrams describe a logical division of functions having physical (hardware and/or software) implementations that are not limited by architecture or the physical layout of the functions. The examples of systems described herein may be implemented in a variety of configurations and operate as hardware/software components in a single hardware/software unit, or in separate hardware/software units.

The executable instructions may be implemented as a computer program product having instructions stored therein which, when executed by a processing module of an electronic system (e.g., the control unit 70 and/or processor 110 schematically depicted in FIG. 1), direct the electronic system to carry out the instructions. The computer program product may be selectively embodied in any non-transitory computer-readable storage medium for use by or in connection with an instruction execution system, apparatus, or device, such as an electronic computer-based system, processor-containing system, or other system that may selectively fetch the instructions from the instruction execution system, apparatus, or device and execute the instructions. In the context of this disclosure, a computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access memory (electronic); a read-only memory (electronic); an erasable programmable read only memory such as, for example, flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program may be electronically captured via, for instance, optical scanning of the paper or other medium, then compiled, interpreted, or otherwise processed in a suitable manner if necessary, and then stored in a computer memory or machine memory.

The invention claimed is:

1. A process for analyzing a sample separation method, the process comprising:
providing a test sample comprising a mix of a plurality of pre-known sample components;
providing absolute sample separation properties for each of the sample components;
experimentally determining a real sample separation result by executing the sample separation method for separating the test sample by a sample separation apparatus; and
determining a real value of at least one operation parameter based on a comparison between the absolute sample separation properties and the real sample separation result for characterizing a real course of the sample separation method.

2. The process according to claim 1, comprising at least one of the following features:
wherein the process comprises providing the test sample with at least part of the sample components having absolute sample separation properties with pronounced temperature dependence;
wherein the process comprises providing the test sample with at least one late eluting sample component and at least one early eluting sample component, the late eluting sample component has an elution speed slower than the early eluting sample component, and the late eluting sample component has absolute sample separation properties with pronounced temperature dependence;
wherein the process comprises providing the test sample with at least part of the sample components having absolute sample separation properties with pronounced flowrate dependence;
wherein the process comprises providing the test sample with at least one early eluting sample component and at least one late eluting sample component, the early eluting sample component has an elution speed faster than the late eluting sample component, and the early eluting sample component has absolute sample separation properties with pronounced flowrate dependence;
wherein the process comprises providing the test sample with at least part of the sample components having absolute sample separation properties with pronounced dependence on a solvent composition; and
wherein the process comprises providing the test sample with at least one sample component with an elution speed between at least one early eluting sample component and at least one late eluting sample component, and having absolute sample separation properties with pronounced dependence on a solvent composition.

3. The process according to claim 1, comprising at least one of the following features:

wherein the absolute sample separation properties are independent of apparatus properties of the sample separation apparatus by which the sample components are separated; and wherein the absolute sample separation properties are chromatographic sample separation properties.

4. The process according to claim 1, comprising determining the absolute sample separation properties by executing calibration measurements for each of the sample components by varying at least one operation parameter.

5. The process according to claim 4, comprising executing the calibration measurements by varying at least one operation parameter selected from the group consisting of: temperature of the respective sample component; flowrate of a mobile phase by which the respective sample component is transported and/or separated; and composition of a mobile phase by which the respective sample component is transported and/or separated.

6. The process according to claim 4, comprising executing the calibration measurements in an isocratic mode.

7. The process according to claim 1, comprising experimentally determining the real sample separation result by executing the sample separation method in a gradient mode.

8. The process according to claim 1, comprising experimentally determining the real sample separation result by executing a chromatographic sample separation method.

9. The process according to claim 1, wherein the real value of the at least one operation parameter is selected from the group consisting of: a temperature during sample separation; a flowrate of a mobile phase by which the test sample is transported and/or separated; a composition of a mobile phase by which the test sample is transported and/or separated; at least one performance value indicative of a performance of the sample separation apparatus; and at least one performance value indicative of whether a performance of the sample separation apparatus complies with a predefined specification.

10. The process according to claim 1, wherein the determining of the real value of the at least one operation parameter comprises determining an ideal sample separation result.

11. The process according to claim 10, comprising one of:
determining the ideal sample separation result by a simulation using the absolute sample separation properties; and
determining the ideal sample separation result by simulating execution of the sample separation method for separating the test sample by the sample separation apparatus using the absolute sample separation properties.

12. The process according to claim 10, comprising one of:
repeatedly determining an ideal sample separation result in an iterative way; and
repeatedly determining an ideal sample separation result in an iterative way, by simulating execution of the sample separation method with different values of the at least one operation parameter.

13. The process according to claim 10, comprising one of:
determining the real value of the at least one operation parameter as the value of the at least one operation parameter that corresponds to an ideal sample separation result complying with the real sample separation result; and
determining the real value of the at least one operation parameter as the value of the at least one operation parameter that corresponds to an ideal sample separation result complying with the real sample separation result, wherein the determining comprises showing the best match with the real sample separation result among the repeatedly and iteratively determined ideal sample separation results.

14. The process according to claim 1, comprising one of:
determining the real value of the at least one operation parameter by carrying out a numerical analysis under consideration of the absolute sample separation properties; and
determining the real value of the at least one operation parameter by carrying out a finite element method analysis under consideration of the absolute sample separation properties.

15. The process according to claim 1, wherein the process, on the basis of a provided further test sample comprising a further mix of a plurality of pre-known further sample components and on the basis of provided absolute sample separation properties for each of the further sample components, comprises:
experimentally determining a further real sample separation result by carrying out the sample separation method for separating the further test sample by the sample separation apparatus; and
determining the real value of the at least one operation parameter based on a comparison between the absolute sample separation properties and the real sample separation result of the mix and the further mix for characterizing the real course of the sample separation method.

16. The process according to claim 1, comprising at least one of the following features:
wherein the process comprises using the determined real value of the at least one operation parameter as a sensed value of the at least one operation parameter;
wherein the process comprises using the determined real value of the at least one operation parameter as a sensed value of the at least one operation parameter, and wherein the sensed value is selected from the group consisting of: a sensed temperature; a sensed flowrate; a sensed solvent composition; and a sensed gradient profile;
wherein the process comprises using the determined real value of the at least one operation parameter as a performance indicator indicating a performance of the sample separation apparatus by which the real sample separation result is experimentally determined;
wherein the process comprises using the determined real value of the at least one operation parameter as a performance indicator indicating whether the sample separation apparatus complies with a predefined specification;
wherein the process comprises using the determined real value of the at least one operation parameter as a performance indicator indicating a performance of the sample separation apparatus by which the real sample separation result is experimentally determined, and wherein the performance indicator is used in the context of at least one selected from the group consisting of: an initial installation of the sample separation apparatus; a repair of the sample separation apparatus; a maintenance of the sample separation apparatus; and an expiry of a pre-defined time since a previous determination of the performance indicator;
wherein the process comprises using the determined real value of the at least one operation parameter for transferring the sample separation method between different sample separation apparatuses;

wherein the process comprises using the determined real value of the at least one operation parameter for diagnosing a potential malfunction of the sample separation apparatus or a part thereof;

wherein the process comprises using the determined real value of the at least one operation parameter for emulating execution of the sample separation method on another sample separation apparatus;

wherein the process comprises using the determined real value of the at least one operation parameter for evaluating a sample separation result obtained by executing the sample separation method on a sample separation apparatus; and wherein the process comprises using the determined real value of the at least one operation parameter for evaluating a sample separation result obtained by executing the sample separation method on a sample separation apparatus, by a sensorless sample separation apparatus and/or by a sample separation apparatus without resources for controlling the at least one operation parameter.

17. A non-transitory computer-readable medium with instructions stored thereon, that when executed by a processor, carry out or control the process according to claim 1.

18. A sample separation apparatus for separating a fluidic sample, the sample separation apparatus comprising:
   a fluid drive for driving a mobile phase and the fluidic sample when injected in the mobile phase;
   a sample separation unit for separating the fluidic sample in the mobile phase; and
   a processor configured for carrying out or controlling the process according to claim 1 using the sample separation apparatus and using the test sample as the fluidic sample.

19. The sample separation apparatus according to claim 18, wherein the sample separation apparatus comprises at least one of the following features:
   the sample separation apparatus comprises the test sample;
   the sample separation apparatus is configured as a chromatography sample separation apparatus;
   the sample separation apparatus comprises a detector configured to detect the separated fluidic sample;
   the sample separation apparatus comprises a fractionating unit configured to collect separated fractions of the fluidic sample;
the sample separation apparatus comprises an injector configured to inject the fluidic sample into the mobile phase.

* * * * *